(12) United States Patent
Yao et al.

(10) Patent No.: US 10,927,239 B2
(45) Date of Patent: Feb. 23, 2021

(54) RESIN COMPOSITION AND RESIN MOLDED ARTICLE

(71) Applicant: Eastman Chemical Company, Kingsport, TN (US)

(72) Inventors: Kenji Yao, Minamiashigara (JP); Ryo Tanaka, Minamiashigara (JP)

(73) Assignee: Eastman Chemical Company, Kingsport, TN (US)

( * ) Notice: Subject to any disclaimer, the term of this patent is extended or adjusted under 35 U.S.C. 154(b) by 0 days.

(21) Appl. No.: 16/502,371

(22) Filed: Jul. 3, 2019

(65) Prior Publication Data

US 2019/0322842 A1 Oct. 24, 2019

Related U.S. Application Data

(63) Continuation of application No. PCT/JP2018/015624, filed on Apr. 13, 2018.

(30) Foreign Application Priority Data

May 25, 2017 (JP) .............................. JP2017-103924

(51) Int. Cl.
*C08L 1/14* (2006.01)
*B29C 45/00* (2006.01)
*B29K 1/00* (2006.01)
*B29K 33/00* (2006.01)

(52) U.S. Cl.
CPC ............ *C08L 1/14* (2013.01); *B29C 45/0001* (2013.01); *B29K 2001/12* (2013.01); *B29K 2033/12* (2013.01); *C08L 2205/03* (2013.01)

(58) Field of Classification Search
CPC ... C08L 1/14; C08L 2205/03; B29K 2001/12; B29C 45/0001

USPC .......................................................... 524/40
See application file for complete search history.

(56) References Cited

U.S. PATENT DOCUMENTS

| 2011/0033640 | A1 | 2/2011 | Yamada et al. |
| 2011/0308712 | A1* | 12/2011 | Takebe .................... C08L 33/04 156/229 |
| 2013/0222741 | A1 | 8/2013 | Kiuchi et al. |

FOREIGN PATENT DOCUMENTS

| JP | 2008088417 | * | 4/2008 | |
| JP | 2011-241264 | A | 12/2011 | |
| JP | 5258233 | B2 | 8/2013 | |
| JP | 2014-178709 | A | 9/2014 | |
| JP | 2015-168708 | A | 9/2015 | |
| JP | 2015168708 | * | 9/2015 | ............... C08L 1/10 |
| WO | 2009/133815 | A1 | 11/2009 | |
| WO | 2012/077587 | A1 | 6/2012 | |
| WO | 2013/191150 | A1 | 12/2013 | |

OTHER PUBLICATIONS

Translation of JP 2015-168708 (application 2014-042333), dated Sep. 28, 2015. (Year: 2015).*
Translation of JP 2008-088417 (application 2007-225095), dated Apr. 17, 2008. (Year: 2008).*
Jun. 12, 2018 Search Report issued in International Patent Application No. PCT/JP2018/015624.
Jun. 12, 2018 Written Opinion issued in International Patent Application No. PCT/JP2018/015624.

* cited by examiner

*Primary Examiner* — Hui H Chin
(74) *Attorney, Agent, or Firm* — Robert C. Morriss

(57) ABSTRACT

A resin composition includes cellulose acetate propionate and polymethyl methacrylate, in which a weight ratio (A)/(B) of a weight (A) of the cellulose acetate propionate to a weight (B) of the polymethyl methacrylate is 0.45 or more and 100 or less.

20 Claims, No Drawings

RESIN COMPOSITION AND RESIN MOLDED ARTICLE

CROSS-REFERENCE TO RELATED APPLICATIONS

This application is based on and claims priority under 35 USC 119 from Japanese Patent Application No. 2017-103924 filed on May 25, 2017.

BACKGROUND

Technical Field

The present invention relates to a resin composition and a resin molded article.

Related Art

Hitherto, various resin compositions have been provided and are used for various applications. Resin compositions are used particularly in various components and housings of home appliances and automobiles and the like. Further, thermoplastic resins are also used in components, for example, housings of business apparatuses and electric and electronic apparatuses.

In recent years, plant-derived resins have been used, and there is a cellulose derivative as one of the plant-derived resins which have been conventionally known.

For example, in JP-A-2015-168708, a cellulose ester composition containing from 2 to 100 parts by weight of (B) a plasticizer and from 1 to 10 parts by weight of (C) a polymer (not including an elastomer) having a methyl methacrylate unit and a weight average molecular weight of 5,000 to 30,000 with respect to 100 parts by weight of (A) a cellulose ester is disclosed.

Further, in Japanese Patent No. 5258233, a film molding method comprising molding, in the form of a film, a hot melt material of a resin composition in which a polymer (A) and a cellulose derivative (B) shown below are blended in a weight ratio (1) or (2) shown below: (1) a resin composition in which polyvinyl acetate as the polymer (A) and cellulose acetate propionate as the cellulose derivative (B) are blended in a weight ratio of (A):(B)=5:5 and (2) a resin composition in which polymethyl methacrylate as the polymer (A) and cellulose acetate propionate as the cellulose derivative (B) are blended in a weight ratio within a range of (A):(B)=9:1 to 7:3 is disclosed.

SUMMARY

Hitherto, a resin molded article obtained by using a resin composition in which polymethyl methacrylate is blended into cellulose acetate in which a part or all of the hydroxyl groups of cellulose is substituted with an acetyl group and the like. Depending on the application, the resin molded articles may be required to have texture, for example, feeling, in some cases. The resin molded article obtained by using a resin composition containing cellulose acetate and polymethyl methacrylate has low smoothness on the surface of the resin molded article in some cases.

Aspects of non-limiting embodiments of the present disclosure related to a resin composition which contains cellulose acetate propionate and polymethyl methacrylate by which a resin molded article having a surface improved in smoothness is obtained in comparison with the case wherein a weight ratio (A)/(B) of a weight (A) of cellulose acetate propionate to a weight (B) of polymethyl methacrylate is less than 0.45, the case wherein the weight ratio (A)/(B) exceeds 100, or the case wherein a ratio of an average friction coefficient to an average deviation of friction coefficient of the surface of the resin molded article is less than 50.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin composition which contains cellulose acetate propionate and polymethyl methacrylate and in which a weight ratio(A)/(B) of a weight (A) of the cellulose acetate propionate to a weight (B) of the polymethyl methacrylate is 0.45 or more and 100 or less.

DETAILED DESCRIPTION

Hereinafter, an exemplary embodiment which is an example of the resin composition and the resin molded article according to the invention will be described.

<Resin Composition>

The resin composition according to the exemplary embodiment contains cellulose acetate propionate and polymethyl methacrylate. A weight ratio (A)/(B) of a weight (A) of the cellulose acetate propionate to a weight (B) of the polymethyl methacrylate is 0.45 or more and 100 or less.

Hitherto, since a cellulose acylate (acylated cellulose derivative) in which a part of hydroxyl groups is substituted with an acyl group is based on non-edible resources and is a primary derivative not requiring chemical polymerization, it is a resin material friendly to the environment. Further, due to the strong hydrogen bond property it has high modulus of elasticity as the resin material. Moreover, it has the feature of high transparency because of the alicyclic structure. Therefore, the resin composition containing the cellulose acylate is required to have coloration, design and texture, for example, feeling, in some cases depending on the application (for example, furniture or eyeglass member) while taking advantage of the characteristics of the resin material using cellulose acylate.

For example, in Japanese Patent No. 5258233 a resin composition in which cellulose acetate propionate and polymethyl methacrylate are mixed in a specific ratio is disclosed. However, although the resin composition is excellent in the coloration, the original smoothness which the cellulose acetate propionate has may decrease in some cases.

On the contrary, the resin composition according to the exemplary embodiment provides a resin molded article having a surface improved in smoothness by taking the configuration described above. The reason for this is not certain, but is presumed to be as follows.

It is known that the smoothness is represented by a ratio of an average friction coefficient to an average deviation of friction coefficient (hereinafter, a "ratio of average friction coefficient to average deviation of friction coefficient" is referred to as a "SMT value" in some cases). As to the SMT value, the larger the numerical value, the more excellent the smoothness.

In the case of measuring a surface of a resin molded article composed of polymethyl methacrylate alone and a surface of a resin molded article composed of cellulose acetate propionate alone, the SMT value in the case of polymethyl methacrylate alone is low in comparison with that in the case of cellulose acetate propionate alone. Thus, it is conceivable that by mixing the both polymers the SMT value becomes an intermediate value between the values obtained by measuring both polymers individually.

However, the SMT value of a surface of a resin molded article in which the weight ratio (A)/(B) of a weight (A) of the cellulose acetate propionate to a weight (B) of the polymethyl methacrylate is 0.45 or more and 100 or less is larger than the SMT value obtained by measuring a surface of a resin molded article composed of cellulose acetate propionate alone. The reason for this is not certain, but is presumed to be as follows.

By mixing polymethyl methacrylate and cellulose acetate propionate in the range described above, discontinuous domains of polymethyl methacrylate and cellulose acetate propionate are formed. The discontinuous domains formed by both polymers have a small size of domain diameter. Thus, it is assumed that the influence of the domain portion formed by cellulose acetate propionate excellent in the smoothness on the frictional resistance of the surface of resin molded article is larger than that of the domain portion formed by polymethyl methacrylate. Further, it is assumed that of the discontinuous domains formed by the both polymers, the domain portion of polymethyl methacrylate has a part of forming a concavity and the domain portion of cellulose acetate propionate has a part of forming a convexity. Thus, it is assumed that the frictional resistance is dominantly influenced by contact with the cellulose acetate propionate and the domain portion of polymethyl methacrylate acts as a space which a censer or a human finger does not contact so that the frictional resistance decreases than the case of using cellulose acetate propionate alone.

From the reasons described above, it is presumed that by mixing polymethyl methacrylate and cellulose acetate propionate in the range described above the smoothness is improved due to the synergistic effect of the both polymers.

By the way, in the case of obtaining a resin molded article using a resin composition composed of a mixture of polymethyl methacrylate and cellulose acetate, the smoothness of the surface of the resin molded article is low. This is presumed to be as follows. Polymethyl methacrylate exhibits lower compatibility in the case of mixing with cellulose acetate than in the case of mixing with cellulose acetate propionate. Thus, in the case of mixing polymethyl methacrylate with cellulose acetate, both polymers are apt to form discontinuous domains having a large domain diameter. As a result, on the surface of a resin molded article in the case of mixing polymethyl methacrylate and cellulose acetate, the influence of polymethyl methacrylate on the frictional resistance tends to increase. Therefore, it is assumed that since the frictional resistance of the surface of the resin molded article increases, the smoothness is difficult to improve.

Hereinafter, the components of the resin composition according to the exemplary embodiment will be described in detail.

[Cellulose Acetate Propionate]

The cellulose acetate propionate is a cellulose derivative in which a part of hydroxyl groups is substituted with an acetyl group and a propionyl group. The cellulose acetate propionate is specifically a cellulose derivative represented by formula (1) shown below.

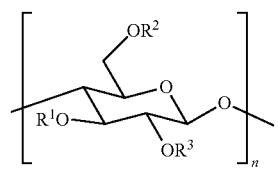

Formula (1)

In formula (1), each of $R^1$, $R^2$ and $R^3$ independently represents a hydrogen atom, an acetyl group or a propionyl group. n represents an integer of 2 or more, provided that at least a part of $nR^1$s, $nR^2$s and $nR^3$s represents an acetyl group and a propionyl group.

In formula (1), a range of n is not particularly limited and may be determined depending on the range of the weight average molecular weight. For example, n is 50 or more and 900 or less.

—Weight Average Molecular Weight—

The weight average molecular weight of the acetyl propionyl cellulose is, for example, preferably 10,000 or more and 300,000 or less, and more preferably 30,000 or more and 200,000 or less.

The weight average molecular weight (Mw) is determined by measuring with a gel permeation chromatography apparatus (GPC apparatus: HLC-8320GPC manufactured by Tosoh Corp., column: TSKgel α-M) using a solution of dimethylacetamide/lithium chloride=90/10 and calculating in terms of polystyrene.

—Content of Propionyl Group—

In the cellulose acetate propionate, the content of a propionyl group with respect to the cellulose acetate propionate is suitably 39% by weight or more and 51% by weight or less, preferably 40% by weight or more and 50% by weight or less, more preferably 41% by weight or more and 49% by weight or less, from the standpoint of improving the smoothness of the surface of the resin molded article.

—Content of Acetyl Group—

In the cellulose acetate propionate, the content of an acetyl group with respect to the cellulose acetate propionate is, for example, suitably 0.1% by weight or more and 10% by weight or less, and preferably 0.5% by weight or more and 5% by weight or less.

—Ratio of Content of Acetyl Group to Content of Propionyl Group—

Regarding the content of propionyl group as ($M_{Pr}$) and the content of acetyl group as ($M_{Ac}$), a content ratio ($M_{Ac}$)/($M_{Pr}$) of the content of acetyl group to the content of propionyl group is suitably 0.005 or more and 0.1 or less, preferably 0.01 or more and 0.07 or less, in a weight ratio.

Here, the content of propionyl group and the content of acetyl group are determined according the method shown below.

The contents are calculated from the integrated values of a peak derived from an acetyl group, a peak derived from a propionyl group and a peak derived from a hydroxyl group with $H^1$-NMR (JMN-ECA manufactured by JEOL RESONANCE Inc.).

Then, using the content of propionyl group and the content of acetyl group obtained by the method, the content ratio ($M_{Ac}$)/($M_{Pr}$) of both groups in a weight ratio is determined.

—Polymerization Degree—

The polymerization degree of the cellulose acetate propionate is preferably 50 or more and 900 or less, more preferably 55 or more and 800 or less, still more preferably 55 or more and 700 or less, from the standpoint of improving the smoothness of the surface of the resin molded article.

Here, the polymerization degree is determined according to the procedure shown below using a weight average molecular weight.

First, a weight average molecular weight of the cellulose acetate propionate is measured by the method described above. Subsequently, the value for weight average molecular weight is divided by a constituting unit molecular weight of the cellulose acetate propionate to determine the polymerization degree of the cellulose acetate propionate.

A method of producing the cellulose acetate propionate is not particularly limited and, for example, a method in which cellulose is subjected to acylation, reduction of molecular weight (depolymerization) and, if desired, deacetylation is exemplified. Further, it may be produced by subjecting commercially available cellulose acetate propionate to reduction of molecular weight (depolymerization) or the like so as to have a predetermined weight average molecular weight.

[Polymethyl Methacrylate]

The resin composition according to the exemplary embodiment contains polymethyl methacrylate.

In the specification, the polymethyl methacrylate is a polymer containing a structural unit derived from methyl methacrylate. The polymethyl methacrylate may be a homopolymer containing only the structural unit derived from methyl methacrylate or a copolymer containing the structural unit derived from methyl methacrylate. The polymethyl methacrylates may be used one kind alone or may be used two or more kinds in combination.

In the case where the polymethyl methacrylate is a copolymer containing a structural unit derived from methyl methacrylate, the amount of the structural unit derived from methyl methacrylate is suitably 50% by weight or more and 99% by weight or less, preferably 60% by weight or more and 95% by weight or less, preferably 70% by weight or more and 95% by weight or less, with respect to the total weight of the copolymer.

In the case where the polymethyl methacrylate is a copolymer containing a structural unit derived from methyl methacrylate, the structural unit other than the structural unit derived from methyl methacrylate includes, for example, a structural unit derived from an alkyl (meth)acrylate other than methyl methacrylate. The amount of the structural unit other than the structural unit derived from methyl methacrylate is suitably 1% by weight or more and 50% by weight or less, preferably 5% by weight or more and 40% by weight or less, preferably 5% by weight or more and 30% by weight or less.

Specifically, the alkyl (meth)acrylate includes, for example, methyl methacrylate, ethyl (meth)acrylate, propyl (meth)acrylate, isopropyl (meth)acrylate, butyl (meth)acrylate, amyl (meth)acrylate, hexyl (meth)acrylate, octyl (meth)acrylate, 2-ethylhexyl (meth)acrylate, cyclohexyl (meth)acrylate, dodecyl (meth)acrylate, octadecyl (meth)acrylate, phenyl (meth)acrylate and benzyl (meth)acrylate. The structural unit derived from an alkyl (meth)acrylate may be contained one kind alone or may be contained two or more kinds in combination.

By the way, in the specification, the (meth)acrylate means both of an acrylate and a methacrylate.

The weight average molecular weight of the polymethyl methacrylate is not particularly limited and is suitably 27,000 or more and 120,000 or less, preferably more than 30,000 and 100,000 or less, more preferably 30,100 or more and 100,000 or less, still more preferably 30,500 or more and 100,000 or less, from the standpoint of improving the smoothness of the surface of the resin molded article.

The weight average molecular weight of the polymethyl methacrylate is a value measured by gel permeation chromatography (GPC). Specifically, the measurement of molecular weight by GPC is performed using as a measurement apparatus, HLC-8320GPC manufactured by Tosoh Corp., as a column, TSKgel α-M manufactured by Tosoh Corp., and as a solvent, tetrahydrofuran. Then, the weight average molecular weight is calculated from the measurement result by using a molecular weight calibration curve prepared using a monodisperse polystyrene standard sample.

[Weight Ratio of Cellulose Acetate Propionate to Polymethyl Methacrylate]

In the resin composition according to the exemplary embodiment, the weight ratio (A)/(B) of a weight (A) of the cellulose acetate propionate to a weight (B) of the polymethyl methacrylate is 0.45 or more and 100 or less. In the case where the weight ratio of (A) to (B) is in this range, the smoothness of the surface of the resin molded article is improved.

In addition, the weight ratio of (A)/(B) is preferably 1 or more and 100 or less, more preferably 1 or more and 50 or less, still more preferably 5 or more and 20 or less, and yet more preferably 5 or more and 10 or less. In the case where the weight ratio of (A)/(B) is in this range, impact resistance is apt to be improved as well as achieving the excellent smoothness of the surface of the resin molded article.

[Contents of Cellulose Acetate Propionate and Polymethyl Methacrylate]

From the standpoint of improving the smoothness of the surface of the resin molded article, the content of the cellulose acetate propionate is suitably 29% by weight or more, suitably 31% by weight or more, with respect to the total amount of the rein composition. Further, it is suitably 99% by weight or less, suitably 97% by weight or less, and suitably 95% by weight or less. From the same standpoint, the content of the polymethyl methacrylate is suitably 1% by weight or more, suitably 3% by weight or more, and suitably 5% by weight or more. Further, it is suitably 71% by weight or less, suitably 69% by weight or less, and suitably 65% by weight or less.

In addition, the total content of the cellulose acetate propionate and polymethyl methacrylate is suitably 94% by weight or more, suitably 98% by weight or more, and may be 100% by weight, with respect to the total amount of the resin composition.

[Other Components]

(Plasticizer)

The resin composition according to the exemplary embodiment may further contain a plasticizer.

The plasticizer includes, for example, an adipic acid ester-containing compound, a polyether ester compound, a condensed phosphoric acid ester compound, a sebacic acid ester compound, a glycol ester compound, an acetic acid ester compound, a dibasic acid ester compound, a phosphoric acid ester compound, a phthalic acid ester compound, camphor, a citric acid ester compound, a stearic acid ester compound, metallic soap, a polyol compound of polyester polyol and a polyalkylene oxide compound.

Of these compounds, at least one selected from the group consisting of an adipic acid ester-containing compound, a polyether ester compound and a polyester polyol is suitable, at least one of an adipic acid ester-containing compound and a polyester polyol is preferred, and any one of an adipic acid ester-containing compound and a polyester polyol is more preferred.

—Adipic Acid Ester-Containing Compound—

The adipic acid ester-containing compound (compound containing an adipic acid ester) refers to a compound of an adipic acid ester alone and a mixture of an adipic acid ester and a component other than the adipic acid ester (compound different from the adipic acid ester). However, the adipic acid ester-containing compound is suitably contain the adipic acid ester by 50% by weight or more with respect to the total components.

The adipic acid ester includes, for example, an adipic acid diester and an adipic acid polyester. Specifically, it includes, for example, an adipic acid diester represented by formula (AE-1) shown below and an adipic acid polyester represented by formula (AE-2) shown below.

substituent include, for example, an alkyl group, an aryl group and a hydroxyl group.

In addition, the molecular weight (or weight average molecular weight) of the adipic acid ester is preferably 100 or more and 10,000 or less, and more preferably 200 or more and 3,000 or less. The weight average molecular weight is a value measured by the same measurement method as in the weight average molecular weight of the polyether ester compound described above.

Specific examples of the adipic acid ester-containing compound are shown below, but the invention is not limited thereto.

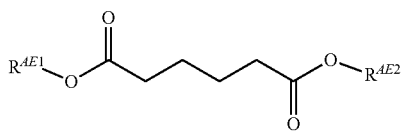

Formula (AE-1)

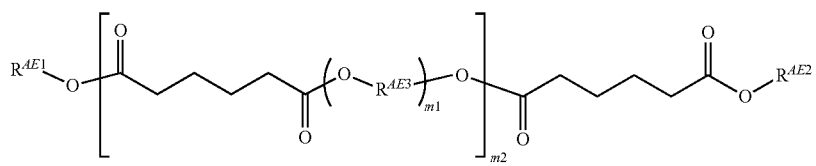

Formula (AE-2)

In formulae (AE-1) and (AE-2), each of $R^{AE1}$ and $R^{AE2}$ independently represents an alkyl group or a polyoxyalkyl group $[-(C_xH_{2x}-O)_y-R^{41}]$ (wherein $R^{41}$ represents an alkyl group, x represents an integer of 1 or more and 6 or less, and y represents an integer of 1 or more and 6 or less); $R^{AE3}$ represents an alkylene group; m1 represents an integer of 1 or more and 5 or less; and m2 represents an integer of 1 or more and 10 or less.

In formulae (AE-1) and (AE-2), the alkyl group represented by $R^{AE1}$ or $R^{AE2}$ is preferably an alkyl group having 1 or more and 6 or less carbon atoms, and more preferably an alkyl group having 1 or more and 4 or less carbon atoms. The alkyl group represented by $R^{AE1}$ or $R^{AE2}$ may have any of a straight-chain, branched and cyclic form, and preferably has a straight-chain or branched form.

In formulae (AE-1) and (AE-2), in the polyoxyalkyl group $[-(C_xH_{2x}-O)_y-R^{41}]$ represented by $R^{AE1}$ or $R^{AE2}$ the alkyl group represented by $R^{41}$ is preferably an alkyl group having 1 or more and 6 or less carbon atoms, and more preferably an alkyl group having 1 or more and 4 or less carbon atoms. The alkyl group represented by $R^{41}$ may have any of a straight-chain, branched and cyclic form, and preferably has a straight-chain or branched form. x represents an integer of 1 or more and 6 or less. y represents an integer of 1 or more and 6 or less.

In formula (AE-2), the alkylene group represented by $R^{AE3}$ is preferably an alkylene group having 1 or more and 6 or less carbon atoms, and more preferably an alkylene group having 1 or more and 4 or less carbon atoms. The alkylene group may have any of a straight-chain, branched and cyclic form, and preferably has a straight-chain or branched form.

In formulae (AE-1) and (AE-2), the group represented by each symbol may be substituted with a substituent. The

| Name of Substance | | Name of Product | Manufacturer |
|---|---|---|---|
| ADP1 | Adipic acid diester | Daifatty-101 | Daihachi Chemical Industry Co., Ltd. |
| ADP2 | Adipic acid diester | ADK CIZER RS-107 | ADEKA Corp. |
| ADP3 | Adipic acid polyester | Polycizer W-230-H | DIC Corp. |

—Polyether Ester Compound—

The polyether ester compound specifically includes, for example, a polyether ester compound represented by formula (EE).

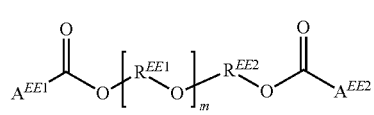

Formula (EE)

In formula (EE), each of $R^{EE1}$ and $R^{EE2}$ independently represents an alkylene group having 2 or more and 10 or less carbon atoms. Each of $A^{EE1}$ and $A^{EE2}$ independently represents an alkyl group having 1 or more and 6 or less carbon atoms, an aryl group having 6 or more and 12 or less carbon atoms or an aralkyl group having 7 or more and 18 or less carbon atoms. m represents an integer of 1 or more.

In formula (EE), the alkylene group represented by $R^{EE1}$ is preferably an alkylene group having 3 or more and 10 or less carbon atoms, and more preferably an alkylene group having 3 or more and 6 or less carbon atoms. The alkylene group represented by $R^{EE1}$ may have any of a straight-chain, branched and cyclic form, and preferably has a straight-chain form.

When the number of carbon atoms of the alkylene group represented by $R^{EE1}$ is 3 or more, the reduction in fluidity of the resin composition is suppressed and thermoplasticity is easily exhibited. When the number of carbon atoms of the alkylene group represented by $R^{EE1}$ is 10 or less or the alkylene group represented by $R^{EE1}$ has a straight-chain form, the affinity to cellulose acetate propionate is easily enhanced. Therefore, when the alkylene group represented by $R^{EE1}$ has a straight-chain form and the number of carbon atoms is in the range described above, moldability of the resin composition is increased.

From this point of view, the alkylene group represented by $R^{EE1}$ is particularly preferably a n-hexylene group (—$(CH_2)_6$—). That is, the polyether ester compound is preferably a compound in which $R^{EE1}$ represents a n-hexylene group (—$(CH_2)_6$—).

In formula (EE), the alkylene group represented by $R^{EE2}$ is preferably an alkylene group having 3 or more and 10 or less carbon atoms, and more preferably an alkylene group having 3 or more and 6 or less carbon atoms. The alkylene group represented by $R^{EE2}$ may have any of a straight-chain, branched and cyclic form, and preferably has a straight-chain form.

When the number of carbon atoms of the alkylene group represented by $R^{EE2}$ is 3 or more, the reduction in fluidity of the resin composition is suppressed and thermoplasticity is easily exhibited. When the number of carbon atoms of the alkylene group represented by $R^{EE2}$ is 10 or less or the alkylene group represented by $R^{EE2}$ has a straight-chain form, the affinity to cellulose acetate propionate is easily enhanced. Therefore, when the alkylene group represented by $R^{EE2}$ has a straight-chain form and the number of carbon atoms is in the range described above, moldability of the resin composition is increased.

From this point of view, the alkylene group represented by $R^{EE2}$ is particularly preferably a n-butylene group (—$(CH_2)_4$—). That is, the polyether ester compound is preferably a compound in which $R^{EE2}$ represents a n-butylene group (—$(CH_2)_4$—).

In formula (EE), the alkyl group represented by $A^{EE1}$ or $A^{EE2}$ is an alkyl group having 1 or more and 6 or less carbon atoms, and preferably an alkyl group having 2 or more and 4 or less carbon atoms. The alkyl group represented by $A^{EE1}$ or $A^{EE2}$ may have any of a straight-chain, branched and cyclic form, and preferably has a branched form.

The aryl group represented by $A^{EE1}$ or $A^{EE2}$ is an aryl group having 6 or more and 12 or less carbon atoms, and includes, for example, an unsubstituted aryl group, for example, a phenyl group or a naphthyl group and a substituted phenyl group, for example, a tert-butylphenyl group or a hydroxyphenyl group.

The aralkyl group represented by $A^{EE1}$ or $A^{EE2}$ is a group represented by —$R^A$-Ph. $R^A$ represents an alkylene group having 1 or more and 6 or less carbon atoms (preferably having 2 or more and 4 or less carbon atoms). Ph represents an unsubstituted phenyl group or a substituted phenyl group which is substituted with a straight-chain or branched alkyl group having 1 or more and 6 or less carbon atoms (preferably having 2 or more and 6 or less carbon atoms). The aralkyl group specifically includes an unsubstituted aralkyl group, for example, a benzyl group, a phenylmethyl group (phenethyl group), a phenylpropyl group or a phenylbutyl group and a substituted aralkyl group, for example, a methylbenzyl group, a dimethylbenzyl group or a methylphenethyl group.

At least one of $A^{EE1}$ and $A^{EE2}$ preferably represents an aryl group or an aralkyl group. That is, the polyether ester compound is preferably a compound in which at least one of $A^{EE1}$ and $A^{EE2}$ represents an aryl group (preferably a phenyl group) or an aralkyl group, and preferably a compound in which both of $A^{EE1}$ and $A^{EE2}$ represent an aryl group (preferably a phenyl group) or an aralkyl group.

Subsequently, the characteristics of the polyether ester compound are described.

The weight average molecular weight (Mw) of the polyether ester compound is preferably 450 or more to 650 or less, and more preferably 500 or more and 600 or less.

When the weight average molecular weight (Mw) is 450 or more, bleeding (phenomenon of deposition) becomes difficult to occur. When the weight average molecular weight (Mw) is 650 or less, the affinity to cellulose acetate propionate is easily enhanced. Therefore, when the weight average molecular weight (Mw) is in the range described above, moldability of the resin composition is increased.

In addition, the weight average molecular weight (Mw) of the polyether ester compound is a value measured by gel permeation chromatography (GPC). Specifically, the measurement of molecular weight by GPC is performed using as a measurement apparatus, HPLC1100 manufactured by Tosoh Corp., as columns, TSKgel GMHHR-M+TSKgel GMHHR-M (7.8 mm I.D. 30 cm) manufactured by Tosoh Corp., and as a solvent, chloroform. Then, the weight average molecular weight is calculated from the measurement result by using a molecular weight calibration curve prepared using a monodisperse polystyrene standard sample.

The viscosity of the polyether ester compound at 25° C. is preferably 35 mPa·s or more and 50 mPa·s or less, and more preferably 40 mPa·s or more and 45 mPa·s or less.

When the viscosity is 35 mPa·s or more, the dispersibility to cellulose acetate propionate is easily increased. When the viscosity is 50 mPa·s or less, anisotropy of the dispersion of the polyether ester compound hardly appears. Therefore, when the viscosity is in the range described above, the moldability of the resin composition is increased.

In addition, the viscosity is a value measured by an E-type viscometer.

The solubility parameter (SP value) of the polyether ester compound is preferably 9.5 or more and 9.9 or less, and more preferably 9.6 or more and 9.8 or less.

When the solubility parameter (SP value) is 9.5 or more and 9.9 or less, the dispersibility to cellulose acetate propionate is easily increased.

The solubility parameter (SP value) is a value calculated by a Fedor's method. Specifically, the solubility parameter (SP value) is calculated, for example, by the equation shown below in accordance with the description in Polym. Eng. Sci., vol. 14, p. 147 (1974).

Equation: SP value=$\sqrt{(Ev/v)}=\sqrt{(\Sigma\Delta ei/\Sigma\Delta vi)}$ (In the equation, Ev: evaporation energy (cal/mol), v: molar volume (cm$^3$/mol), $\Delta ei$: evaporation energy of each atom or atom group, and $\Delta vi$: molar volume of each atom or atom group)

In addition, the solubility parameter (SP value) employs (cal/cm$^3$)$^{1/2}$ as a unit, but the unit is omitted in accordance with practice, and is described in a dimensionless manner.

Specific examples of the polyether ester compound are shown below, but the invention is not limited thereto.

| | $R^{EE1}$ | $R^{EE2}$ | $A^{EE1}$ | $A^{EE2}$ | Mw | Viscosity (25° C.) | APHA | SP Value |
|---|---|---|---|---|---|---|---|---|
| PEE1 | —(CH$_2$)$_6$— | —(CH$_2$)$_4$— | Phenyl Group | Phenyl Group | 550 | 43 | 120 | 9.7 |
| PEE2 | —(CH$_2$)$_2$— | —(CH$_2$)$_4$— | Phenyl Group | Phenyl Group | 570 | 44 | 115 | 9.4 |
| PEE3 | —(CH$_2$)$_{10}$— | —(CH$_2$)$_4$— | Phenyl Group | Phenyl Group | 520 | 48 | 110 | 10.0 |
| PEE4 | —(CH$_2$)$_6$— | —(CH$_2$)$_2$— | Phenyl Group | Phenyl Group | 550 | 43 | 115 | 9.3 |
| PEE5 | —(CH$_2$)$_6$— | —(CH$_2$)$_{10}$— | Phenyl Group | Phenyl Group | 540 | 45 | 115 | 10.1 |
| PEE6 | —(CH$_2$)$_6$— | —(CH$_2$)$_4$— | tert-Butyl Group | tert-Butyl Group | 520 | 44 | 130 | 9.7 |
| PEE7 | —(CH$_2$)$_6$— | —(CH$_2$)$_4$— | Phenyl Group | Phenyl Group | 460 | 45 | 125 | 9.7 |
| PEE8 | —(CH$_2$)$_6$— | —(CH$_2$)$_4$— | Phenyl Group | Phenyl Group | 630 | 40 | 120 | 9.7 |
| PEE9 | —(CH$_2$)$_6$— | —(CH$_2$)$_4$— | Phenyl Group | Phenyl Group | 420 | 43 | 135 | 9.7 |
| PEE10 | —(CH$_2$)$_6$— | —(CH$_2$)$_4$— | Phenyl Group | Phenyl Group | 670 | 48 | 105 | 9.7 |
| PEE11 | —(CH$_2$)$_6$— | —(CH$_2$)$_4$— | Phenyl Group | Phenyl Group | 550 | 35 | 130 | 9.7 |
| PEE12 | —(CH$_2$)$_6$— | —(CH$_2$)$_4$— | Phenyl Group | Phenyl Group | 550 | 49 | 125 | 9.7 |
| PEE13 | —(CH$_2$)$_6$— | —(CH$_2$)$_4$— | Phenyl Group | Phenyl Group | 550 | 32 | 120 | 9.7 |
| PEE14 | —(CH$_2$)$_6$— | —(CH$_2$)$_4$— | Phenyl Group | Phenyl Group | 550 | 53 | 105 | 9.7 |
| PEE15 | —(CH$_2$)$_6$— | —(CH$_2$)$_4$— | Phenyl Group | Phenyl Group | 550 | 43 | 135 | 9.7 |
| PEE16 | —(CH$_2$)$_6$— | —(CH$_2$)$_4$— | Phenyl Group | Phenyl Group | 550 | 43 | 105 | 9.7 |
| PEE17 | —(CH$_2$)$_6$— | —(CH$_2$)$_4$— | Phenyl Group | Phenyl Group | 550 | 43 | 150 | 9.7 |
| PEE18 | —(CH$_2$)$_6$— | —(CH$_2$)$_4$— | Phenyl Group | Phenyl Group | 550 | 43 | 95 | 9.7 |

—Polyester Polyol—

The polyester polyol may be a compound obtained by reacting, for example, a polyhydric alcohol component with a polyvalent carboxylic acid component. Further, it may be a compound obtained by reacting a polyhydric alcohol component with an anhydride of a polyvalent carboxylic acid or a lower alkyl (having 1 or more and 5 or less carbon atoms) ester of a polybasic acid.

The polyhydric alcohol component specifically includes, for example, ethylene glycol, 1,2-propylene glycol, 1,3-propylene glycol, 1,4-butanediol, 1,4-butenediol, 1,5-pentanediol, 1,6-hexanediol, 1,9-nonanediol, 1,10-decanediol, methylpentanediol, diethylene glycol, triethylene glycol and neopentyl glycol. The polyhydric alcohols may be used one kind alone or may be used two or more kinds in combination.

The polyvalent carboxylic acid component specifically includes, for example, maleic acid, fumaric acid, succinic acid, adipic acid, sebacic acid, azelaic acid, 1,10-decanedicarboxylic acid, phthalic acid, terephthalic acid, isophthalic acid and naphthalenedicarboxylic acid, anhydrides of these acids and lower alkyl (having 1 or more and 5 or less carbon atoms) esters of these acids. The polyvalent carboxylic acids may be used one kind alone or may be used two or more kinds in combination.

Specific examples of the polyester polyol include for example, "Polylite" series manufactured by DIC Corp.

In the case where the resin composition according to the exemplary embodiment contains a plasticizer, from the standpoint of improving the smoothness of the surface of the resin molded article, the weight ratio (A)/(C) of a weight (A) of the cellulose acetate propionate to a weight (C) of the plasticizer is suitably 10 or more and 50 or less. It is preferably 10 or more and 20 or less.

In the case where the resin composition according to the exemplary embodiment contains a plasticizer, the content of the plasticizer to the total amount of the resin composition is not particularly limited. From the standpoint of easily obtaining the resin molded article having the surface improved in smoothness even when the plasticizer is contained, the content of the plasticizer to the total amount of the resin composition is suitably 6% by weight or less (preferably 2% by weight or less). From the same standpoint, the content of the plasticizer may be 0% by weight. Here, the expression "0% by weight" means that other components are not included. When the content of the plasticizer is in the range described above, bleeding of the plasticizer is also easily suppressed.

(Other Components Excepting Plasticizer)

The resin composition according to the exemplary embodiment may further contain other components excepting the components described above, if desired. Other components include, for example, a flame retardant, a compatibilizer, an antioxidant, a release agent, a light resistant agent, a weather resistant agent, a colorant, a pigment, a modifier, a drip preventing agent, an antistatic agent, a hydrolysis inhibitor, a filler, and a reinforcing agent (glass fiber, carbon fiber, talc, clay, mica, glass flake, milled glass, glass bead, crystalline silica, alumina, silicon nitride, aluminum nitride, boron nitride and the like).

Further, if desired, a component (additive), for example, an acid acceptor for preventing acetic acid release or a reactive trapping agent may be added. The acid acceptor includes, for example, an oxide, for example, magnesium oxide or aluminum oxide; a metal hydroxide, for example, magnesium hydroxide, calcium hydroxide, aluminum hydroxide or hydrotalcite; calcium carbonate; and talc.

The reactive trapping agent include, for example, an epoxy compound, an acid anhydride compound and a carbodiimide.

The content of the respective components is preferably 0% by weight or more and 5% by weight or less with respect to the total amount of the resin composition. Here, the expression "0% by weight" means that other components are not included.

The resin composition according to the exemplary embodiment may contain other resins than the resins (cellulose acetate propionate and polymethyl methacrylate) described above. However, in the case of containing other resins, the content of the other resins with respect to the total amount of the resin composition is suitably 5% by weight or less, and preferably less than 1% by weight. It is more preferred that other resins are not contained (that is, 0% by weight).

Other resins include, for example, conventionally known thermoplastic resins, and specifically include, for example, a polycarbonate resin; a polypropylene resin; a polyester resin; a polyolefin resin; a polyester carbonate resin; a polyphenylene ether resin; a polyphenylene sulfide resin; a polysulfone resin; a polyether sulfone resin; a polyarylene resin; a polyetherimide resin; a polyacetal resin; a polyvinyl acetal resin; a polyketone resin; a polyetherketone resin; a polyetheretherketone resin; a polyarylketone resin; a polyethernitrile resin; a liquid crystal resin; a polybenzimidazole resin; a polyparabanic acid resin; a vinyl polymer or a vinyl copolymer obtained by polymerizing or copolymerizing one or more vinyl monomers selected from the group consisting of an aromatic alkenyl compound, a methacrylic acid ester, an acrylic acid ester and a vinyl cyanide compound; a diene-aromatic alkenyl compound copolymer; a vinyl cyanide-diene-aromatic alkenyl compound copolymer; an aromatic alkenyl compound-diene-vinyl cyanide-N-phenylmaleimide copolymer; a vinyl cyanide-(ethylene-diene-propylene (EPDM))-aromatic alkenyl compound copolymer; a vinyl chloride resin; and a chlorinated vinyl chloride resin. Further, a core-shell type butadiene-methyl methacrylate copolymer is also exemplified. These resins may be used one kind alone or may be used two or more kinds in combination.

[STM Value]

The STM value is represented by a ratio of the average friction coefficient to the average deviation of friction coefficient as described above. The STM value is able to be measured, for example, by a friction tester (manufactured by Kato Tech Co., Ltd.).

The resin composition according to the exemplary embodiment provides a resin molded article a surface of which has the ratio of the average friction coefficient to the average deviation of friction coefficient of 50 or more. That is, the surface of the resin molded article obtained by using the resin composition according to the exemplary embodiment exhibits 50 or more as the STM value. From the standpoint of improving the smoothness of the surface of the resin molded article, the SMT value is suitably 53 or more, and preferably 57 or more. Since the larger the STM value, the higher the smoothness feeling, the upper limit of the SMT value is not particularly limited, and, for example, it is 70 or less.

In order to achieve the STM value of 50 or more, it is suitable to incorporate the polymethyl methacrylate and the cellulose acetate propionate into the resin composition in the range of the weight ratio (A)/(B) of a weight (A) of the cellulose acetate propionate to a weight (B) of the polymethyl methacrylate as described above.

[Method of Producing Resin Composition]

The resin composition according to the exemplary embodiment includes, for example, a step of preparing a resin composition containing cellulose acetate propionate and polymethyl methacrylate.

The resin composition according to the exemplary embodiment is produced by melting and kneading a mixture containing cellulose acetate propionate and polymethyl methacrylate, and, if desired, a plasticizer, other components and the like. In addition, the resin composition according to the exemplary embodiment is produced, for example, by dissolving the components described above in a solvent.

A melting and kneading means includes known means and specifically includes, for example, a twin screw extruder, a Henschel mixer, a Banbury mixer, a single screw extruder, a multi-screw extruder and a co-kneader.

<Resin Molded Article>

The resin molded article according to the exemplary embodiment contains the resin composition according to the exemplary embodiment. That is, the resin molded article according to the exemplary embodiment is composed of the same composition as the resin composition according to the exemplary embodiment.

As the method of molding the resin molded article according to the exemplary embodiment, injection molding is preferred from the standpoint of high degree of freedom in shape. From this point of view, the resin molded article is preferably a resin molded article obtained by injection molding.

The cylinder temperature of the injection molding is, for example, 200° C. or more and 300° C. or less, and preferably 240° C. or more and 280° C. or less. The mold temperature of the injection molding is, for example, 40° C. or more and 90° C. or less, and preferably 60° C. or more and 80° C. or less.

The injection molding may be performed, for example, by using a commercially available apparatus, for example, NEX500 manufactured by Nissei Plastic Industrial Co., Ltd., NEX150 manufactured by Nissei Plastic Industrial Co., Ltd., NEX70000 manufactured by Nissei Plastic Industrial Co., Ltd., PNX40 manufactured by Nissei Plastic Industrial Co., Ltd. and SE50D manufactured by Sumitomo Heavy Industries, Ltd.

The molding method for obtaining the resin molded article according to the exemplary embodiment is not limited to the injection molding described above and, for example, extrusion molding, blow molding, heat press molding, calendaring molding, coating molding, cast molding, dipping molding, vacuum molding and transfer molding may be applied.

The resin molded article according to the exemplary embodiment is preferably used for the purposes of electric and electronic apparatuses, business apparatuses, home appliances, automobile interior materials, containers and the like. More specifically, the resin molded article is used in housings of electric and electronic apparatuses or home appliances; various components of electric and electronic apparatuses or home appliances; interior components of automobiles; storage cases of CD-ROM, DVD and the like; tableware; drink bottles; food trays; wrapping materials; films; sheets and the like.

EXAMPLES

The invention will be described more specifically with reference to the examples, but the invention should not be construed as being limited the examples. In addition, unless otherwise noted, "part" refers to "part by weight".

<Preparation of Cellulose Acetate Propionate>

(Preparation of Cellulose Acetate Propionates (CAP1 to CAP3))

Three kinds of commercially available cellulose acetate propionates shown below are prepared.

CAP-482-0.5, CAP-504-0.2 and CAP-482-20 (all manufactured by Eastman Chemical Co.) are prepared as Cellulose acetate propionates (CAP1), Cellulose acetate propionates (CAP2) and Cellulose acetate propionates (CAP3), respectively.

(Synthesis of Cellulose Acetate Propionate (CAP4))

Acylation: 3 parts of cellulose powder (KC Flock W50 manufactured by Nippon Paper Chemicals Co., Ltd.), 0.15 parts of sulfuric acid, 30 parts of acetic acid, 0.09 parts of acetic anhydride and 1.5 parts of propionic anhydride are charged in a reaction vessel, and the mixture is stirred at 20° C. for 4 hours.

Washing: After the completion of the stirring, the mixture is washed with pure water using a filter press (SF(PP) manufactured by Kurita Machinery Mfg. Co., Ltd.) until the electrical conductivity reaches to 50 µS or less, and then dried.

After treatment: To 3 parts of white powder after drying are added 0.2 parts of calcium acetate and 30 parts of pure water, and the mixture is stirred at 25° C. for 2 hours, then filtered, and the resulting powder is dried at 60° C. for 72 hours to obtain about 2.5 parts of Cellulose acetate propionate (CAP4)

(Synthesis of Cellulose Acetate Propionate (CAP5 ))

Cellulose acetate propionate (CAP5) is obtained in the same manner as in Synthesis of Cellulose acetate propionate (CAP4) except that 1.5 parts of propionic anhydride used in the acylation is changed to 4 parts, and further the reaction temperature and the reaction time are changed to 60° C. and 10 hours, respectively.

(Synthesis of Cellulose Acetate Propionate (CAP6))

Cellulose acetate propionate (CAP6) is obtained in the same manner as in Synthesis of Cellulose acetate propionate (CAP4) except that 1.5 parts of propionic anhydride used in the acylation is changed to 2 parts, and further the reaction temperature and the reaction time are changed to 20° C. and 1 hour, respectively.

(Synthesis of Cellulose Acetate Propionate (CAP7))

Cellulose acetate propionate (CAP7) is obtained in the same manner as in Synthesis of Cellulose acetate propionate (CAP4) except that 1.5 parts of propionic anhydride used in the acylation is changed to 2 parts, and further the reaction temperature and the reaction time are changed to 80° C. and 15 hours, respectively.

<Preparation of Cellulose Acetate>

(Preparation of Cellulose Acetate (CA1))

Commercially available cellulose acetate (L50 manufactured by Daicel Corp.) is prepared as Cellulose acetate (CA1).

<Measurements of Polymerization Degree and Contents of Propionyl Group and the Like>

The measurement of the polymerization degree of cellulose acetate propionate and measurement of the contents of the acetyl group, propionyl group and hydroxyl group with respect to cellulose acetate propionate are performed according to the methods described hereinbefore. The results are collectively shown in Table 1. Further, the polymerization degree of cellulose acetate and the content of the acetyl group with respect to cellulose acetate are measured by the same measurement methods as in the cellulose acetate propionate. The results are collectively shown in Table 1.

TABLE 1

| No. of Cellulose Acylate | Acetyl Group (% by weight) | Propionyl Group (% by weight) | Hydroxyl Group (% by weight) | Polymerization Degree |
|---|---|---|---|---|
| CAP1 | 2.5 | 45 | 2.5 | 185 |
| CAP2 | 0.6 | 42.5 | 5 | 105 |
| CAP3 | 1.3 | 48 | 1.7 | 490 |
| CAP4 | 2 | 38 | 4 | 555 |
| CAP5 | 1.5 | 52 | 0.9 | 890 |
| CAP6 | 2 | 42 | 4 | 45 |
| CAP7 | 2 | 42 | 4 | 950 |
| CA1 | 39.8 | 0 | 3.5 | 440 |

<Preparation of Polymethyl Methacrylate>
(Preparation of Polymethyl Methacrylates (PMMA1) to (PMMA5))

As the polymethyl methacrylate, polymethyl methacrylates shown in Table 2 are prepared.

Further, the weight average molecular weights of the respective polymethyl methacrylates prepared are measured according to the method described hereinbefore, and the results are collectively shown in Table 2.

TABLE 2

| No. of Polymethyl Methacrylate | Name of Product | Manufacturer | Weight Average Molecular Weight |
|---|---|---|---|
| PMMA1 | Delpet 500V | Asahi Kasei Chemicals Corp. | 30,500 |
| PMMA2 | Delpet 720V | Asahi Kasei Chemicals Corp. | 55,000 |
| PMMA3 | Acrypet VH | Mitsubishi Rayon Co., Ltd. | 89,000 |
| PMMA4 | Delpowder | Asahi Kasei Chemicals Corp. | 28,500 |
| PMMA5 | Delpet 80HD | Asahi Kasei Chemicals Corp. | 100,800 |

<Preparation of Other Additives>
(Preparation of Other Additives (PR1) to (PR5))

As other additives, plasticizers shown in Table 3 are prepared.

TABLE 3

| NO. of Plasticizer | Compound | Name of Product | Manufacturer |
|---|---|---|---|
| PR1 | Adipic Acid Diester | Daifatty-101 | Daihachi Chemical Industry Co., Ltd. |
| PR2 | Adipic Acid Polyester | Polycizer W-230-H | DIC Corp. |
| PR3 | Polyether Ester Compound | ADK CIZER RS-1000 | ADEKA Corp. |
| PR4 | Polyester Polyol | Polylite ODX-2420 | DIC Corp. |
| PR5 | Dioctyl Adipate | ODA | Mitsubishi Chemical Corp. |

Examples 1 to 25 and Comparative Examples 1 to 6

—Kneading and Injection Molding—

Kneading is performed by a twin screw kneading apparatus (TEX41SS manufactured by Toshiba Machine Co., Ltd.) in the charging composition ratio shown in Table 4 and at the cylinder temperature adjusted as shown in Table 4 to obtain a resin composition (pellet).

D2 test piece (60 mm×60 mm, thickness of 2 mm) is molded from the pellets obtained by using an injection molding machine (NEX140III manufactured by Nissei Plastic Industrial Co., Ltd.) at the cylinder temperature at which the injection peak pressure did not exceed 180 MPa. Further, ISO multi-purpose dumbbell test piece (width of measurement part of 10 mm×thickness of 4 mm) is molded under the same conditions.

[Evaluation]
—Evaluation of Smoothness—

The D2 test piece obtained is set on a friction tester (KES-SE-SRU manufactured by Kato Tech Co., Ltd., using a 0.2 mm wire, a probe having a contact area of 20×20 mm) and the SMT value is measured in an environment of 20° C. and 35% RH under the conditions of a load of 150 g and a speed of 1 mm/min. The larger the SMT value, the higher the smoothness. The results are collectively shown in Table 4.

—Charpy Impact Strength—

The ISO multi-purpose dumbbell test piece obtained is subjected to notching using a notching apparatus (Notching Tool manufactured by Toyo Seiki Seisaku-sho, Ltd.), and the Charpy impact strength is measured using a digital impact resistance measurement apparatus (DG-UB Model manufactured by Toyo Seiki Seisaku-sho, Ltd.) by the method in accordance with ISO-179-1. The results are collectively shown in Table 4.

TABLE 4

| Classification | AC (A) Kind | AC (A) Amount | PMMA (B) Kind | PMMA (B) Amount | Weight Ratio (A)/(B) | Plasticizer (C) Kind | Plasticizer (C) Amount | Weight Ratio (A)/(C) | Cylinder Temperature (°C) Kneading | Cylinder Temperature (°C) Injection Molding | SMT Value | Charpy Impact Strength (kJ/m$^2$) |
|---|---|---|---|---|---|---|---|---|---|---|---|---|
| Example 1 | CAP1 | 100 | PMMA2 | 25 | 4 | — | — | — | 210 | 220 | 60 | 7.8 |
| Example 2 | CAP2 | 100 | PMMA2 | 25 | 4 | — | — | — | 210 | 220 | 60 | 7.6 |
| Example 3 | CAP3 | 100 | PMMA2 | 25 | 4 | — | — | — | 210 | 220 | 60 | 8.5 |
| Example 4 | CAP4 | 100 | PMMA2 | 25 | 4 | — | — | — | 210 | 220 | 55 | 7 |
| Example 5 | CAP5 | 100 | PMMA2 | 25 | 4 | — | — | — | 210 | 220 | 55 | 6.8 |
| Example 6 | CAP6 | 100 | PMMA2 | 25 | 4 | — | — | — | 210 | 220 | 56 | 6.5 |
| Example 7 | CAP7 | 100 | PMMA2 | 25 | 4 | — | — | — | 210 | 220 | 56 | 7 |
| Example 8 | CAP3 | 50 | PMMA2 | 100 | 0.5 | — | — | — | 210 | 220 | 60 | 7.1 |
| Example 9 | CAP3 | 100 | PMMA2 | 1 | 100 | — | — | — | 230 | 240 | 59 | 7.7 |
| Example 10 | CAP3 | 100 | PMMA1 | 25 | 4 | — | — | — | 210 | 220 | 59 | 7.4 |
| Example 11 | CAP3 | 100 | PMMA3 | 25 | 4 | — | — | — | 210 | 220 | 60 | 7.4 |
| Example 12 | CAP3 | 100 | PMMA4 | 25 | 4 | — | — | — | 210 | 220 | 55 | 6.4 |
| Example 13 | CAP3 | 100 | PMMA5 | 25 | 4 | — | — | — | 210 | 220 | 54 | 7 |
| Example 14 | CAP3 | 100 | PMMA2 | 20 | 5 | PR1 | 5 | 20 | 200 | 200 | 60 | 9.8 |
| Example 15 | CAP3 | 100 | PMMA2 | 20 | 5 | PR2 | 5 | 20 | 200 | 200 | 59 | 9.6 |
| Example 16 | CAP3 | 100 | PMMA2 | 20 | 5 | PR3 | 5 | 20 | 200 | 200 | 60 | 9.5 |
| Example 17 | CAP3 | 100 | PMMA2 | 20 | 5 | PR4 | 5 | 20 | 200 | 200 | 60 | 9.8 |
| Example 18 | CAP3 | 100 | PMMA2 | 20 | 5 | PR5 | 5 | 20 | 200 | 200 | 59 | 11.5 |
| Example 19 | CAP3 | 100 | PMMA2 | 20 | 5 | PR5 | 2 | 50 | 210 | 220 | 60 | 11.2 |
| Example 20 | CAP3 | 100 | PMMA2 | 5 | 20 | PR5 | 20 | 5 | 190 | 200 | 52 | 14.8 |
| Example 21 | CAP3 | 100 | PMMA2 | 20 | 5 | PR1 | 1.8 | 56 | 210 | 220 | 55 | 8.6 |
| Example 22 | CAP3 | 100 | PMMA2 | 20 | 5 | — | — | — | 210 | 220 | 60 | 8.8 |
| Example 23 | CAP3 | 100 | PMMA2 | 10 | 10 | — | — | — | 210 | 220 | 60 | 8.7 |
| Example 24 | CAP3 | 100 | PMMA2 | 5 | 20 | — | — | — | 210 | 220 | 59 | 8.5 |
| Example 25 | CAP3 | 100 | PMMA2 | 2 | 50 | — | — | — | 210 | 220 | 59 | 8.5 |
| Comparative Example 1 | CAP3 | 100 | — | — | — | — | — | — | 240 | 240 | 49 | 4.3 |
| Comparative Example 2 | — | — | PMMA2 | 100 | — | — | — | — | 230 | 230 | 35 | 1.8 |
| Comparative Example 3 | CA1 | 100 | PMMA2 | 25 | 4 | PR1 | 15 | 6.7 | 230 | 240 | 32 | 5.5 |
| Comparative Example 4 | CAP3 | 30 | PMMA3 | 70 | 0.43 | — | — | — | 220 | 230 | 38 | 2 |
| Comparative Example 5 | CAP3 | 100 | PMMA3 | 0.8 | 125 | — | — | — | 230 | 240 | 46 | 4.1 |
| Comparative Example 6 | CA1 | 100 | PMMA4 | 5 | 20 | PR1 | 20 | 5 | 230 | 240 | 45 | 3.8 |

In Table 4, "AC" and "PMMA" represent cellulose acylate and polymethyl methacrylate, respectively.

Further, the SMT value is s value obtained by dividing an average friction coefficient by an average deviation of friction coefficient.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A resin composition comprising:
a cellulose acetate propionate and
a polymethyl methacrylate,
wherein a weight ratio (A)/(B) of a weight (A) of the cellulose acetate propionate to a weight (B) of the polymethyl methacrylate is 4 or more and 100 or less, and
wherein the weight average molecular weight of the polymethyl methacrylate is 30,100 or more and 100,800 or less.

2. A resin molded article comprising a resin composition that contains a cellulose acetate propionate and a polymethyl methacrylate, wherein a ratio of an average friction coefficient of a surface of the resin molded article to an average deviation of friction coefficient of the surface of the resin molded article is 50 or more.

3. The resin composition according to claim 1, wherein a total content of the cellulose acetate propionate and the polymethyl methacrylate with respect to a total amount of the resin composition is 94% by weight or more.

4. The resin composition according to claim 1, wherein a content of a propionyl group in the cellulose acetate propionate with respect to the cellulose acetate propionate is 39% by weight or more and 51% by weight or less.

5. The resin composition according to claim 4, wherein the content of the propionyl group in the cellulose acetate propionate with respect to the cellulose acetate propionate is 40% by weight or more and 50% by weight or less.

6. The resin composition according to claim 1, wherein a polymerization degree of the cellulose acetate propionate is 50 or more and 900 or less.

7. The resin composition according to claim 6, wherein the polymerization degree of the cellulose acetate propionate is 50 or more and 700 or less.

8. The resin composition according to claim 1, wherein the weight ratio (A)/(B) of a weight (A) of the cellulose acetate propionate to a weight (B) of the polymethyl methacrylate is from 20 to 100 .

9. The resin composition according to Claim 1, wherein the weight average molecular weight of the polymethyl methacrylate is 30,500 or more and 100,000 or less.

10. The resin composition according to claim 1, further comprising a plasticizer.

11. The resin composition according to claim 10, wherein a weight ratio (A)/(C) of a weight (A) of the cellulose acetate propionate to a weight (C) of the plasticizer is 10 or more and 50 or less.

12. The resin composition according to claim 10, wherein the plasticizer is one of an adipic acid ester-containing compound and a polyester polyol.

13. A resin molded article comprising the resin composition according claim 1.

14. The resin molded article according to claim 13, wherein the resin molded article is an injection molded article.

15. The resin molded article according to claim 2, wherein a total content of the cellulose acetate propionate and the polymethyl methacrylate with respect to a total amount of the resin composition is 94% by weight or more.

16. The resin molded article according to claim 2, wherein a content of a propionyl group in the cellulose acetate propionate with respect to the cellulose acetate propionate is 39% by weight or more and 51% by weight or less.

17. The resin molded article according to claim 2, wherein a polymerization degree of the cellulose acetate propionate is 50 or more and 900 or less.

18. The resin molded article according to claim 2, wherein a weight average molecular weight of the polymethyl methacrylate is 30,500 or more and 100,800 or less.

19. The resin molded article according to claim 2, further comprising a plasticizer.

20. The resin molded article according to claim 19, wherein a weight ratio (A)/(C) of a weight (A) of the cellulose acetate propionate to a weight (C) of the plasticizer is 10 or more and 50 or less.

* * * * *